United States Patent
Bear et al.

(10) Patent No.: US 7,372,371 B2
(45) Date of Patent: May 13, 2008

(54) NOTIFICATION LIGHTS, LOCATIONS AND RULES FOR A COMPUTER SYSTEM

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Adrian M. Chandley, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 10/429,931

(22) Filed: May 5, 2003

(65) Prior Publication Data

US 2004/0222977 A1    Nov. 11, 2004

(51) Int. Cl.
  *G08G 5/00* (2006.01)
  *G09G 1/06* (2006.01)
  *G06F 3/048* (2006.01)
(52) U.S. Cl. .............. 340/815.4; 340/691.1; 340/691.4; 340/691.6; 345/30; 715/859; 715/860
(58) Field of Classification Search .............. None
  See application file for complete search history.

(56) References Cited

U.S. PATENT DOCUMENTS

| | | | |
|---|---|---|---|
| 4,860,342 A | 8/1989 | Danner | 379/96 |
| 5,353,240 A * | 10/1994 | Mallory et al. | 702/186 |
| 5,412,417 A | 5/1995 | Tozuka | |
| 5,487,181 A | 1/1996 | Dailey | |
| 5,519,832 A * | 5/1996 | Warchol | 714/46 |
| 5,546,538 A | 8/1996 | Cobbley | |
| 5,568,540 A | 10/1996 | Greco | 379/88.25 |
| 5,657,414 A | 8/1997 | Lett | |

(Continued)

FOREIGN PATENT DOCUMENTS

EP    0772327 A2    5/1997

(Continued)

OTHER PUBLICATIONS

Anonymous, International Search Report in Corresponding EP Application No. EP 04 00 9868.

(Continued)

*Primary Examiner*—Toan N. Pham
(74) *Attorney, Agent, or Firm*—Workman Nydegger

(57) ABSTRACT

Notifications to computer users are provided via indicators such as lights. The indicators are controlled according to rules, to convey computer-related state information to users in a consistent manner. Locations of visible indicators are chosen to facilitate easy viewing. The rules dictate colors and/or illumination pattern components that together provide users with important computer-related information. For example, colors are assigned to types of information, and illumination patterns generally to behavior-related information. Colors may be combined in various illumination patterns. In one implementation, many or all of the visible indicators may be grouped together on a single control panel from rapid viewing. Alternatively, the visible indicators may be grouped by function or other logical arrangement, such as on the keyboard and/or frame of a monitor. Alternative light sources that illuminate the system (e.g., the monitor bezel) to convey state information, instead of or in addition to individual indicators, are also described.

72 Claims, 15 Drawing Sheets

U.S. PATENT DOCUMENTS

| | | | |
|---|---|---|---|
| 5,675,374 A | 10/1997 | Kohda | 348/14.1 |
| 5,675,810 A | 10/1997 | Sellers | |
| 5,768,164 A | 6/1998 | Hollon, Jr. | |
| 5,802,305 A | 9/1998 | McKaughan | |
| 5,874,930 A * | 2/1999 | McRobert et al. | 345/44 |
| 5,995,012 A * | 11/1999 | Lee et al. | 340/815.45 |
| 6,006,285 A | 12/1999 | Jacobs | |
| 6,052,442 A | 4/2000 | Cooper et al. | 379/88.19 |
| 6,101,610 A | 8/2000 | Beebe | |
| 6,144,363 A * | 11/2000 | Alloul et al. | 345/618 |
| 6,144,644 A | 11/2000 | Bajzath et al. | 370/259 |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,240,168 B1 | 5/2001 | Stanford et al. | 379/110.01 |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,483,905 B1 | 11/2002 | Kikinis | 379/93.24 |
| 6,507,356 B1 | 1/2003 | Jackel et al. | 348/14.06 |
| 6,513,128 B1 | 1/2003 | Wang | |
| 6,518,957 B1 | 2/2003 | Lehtinen et al. | 345/173 |
| 6,546,262 B1 | 4/2003 | Freadman | |
| 6,603,855 B1 | 8/2003 | Cannon et al. | 379/377 |
| 6,628,194 B1 | 9/2003 | Hellebust | 340/7.5 |
| 6,628,267 B2 | 9/2003 | Karidis | |
| 6,671,356 B2 | 12/2003 | Lewis | 379/88.13 |
| 6,671,743 B1 | 12/2003 | Verity | 709/321 |
| 6,691,233 B1 | 2/2004 | Gannage | |
| 6,731,316 B2 | 5/2004 | Herigstad et al. | 715/864 |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,819,961 B2 | 11/2004 | Jacobs | |
| 6,831,657 B2 | 12/2004 | Tsutsumi et al. | 345/589 |
| 6,867,704 B2 * | 3/2005 | Pellegrino | 340/815.45 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,919,816 B2 * | 7/2005 | Dearborn et al. | 340/815.45 |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,221,331 B2 | 5/2007 | Bear | |
| 2001/0040551 A1 | 11/2001 | Yates et al. | 345/156 |
| 2002/0015020 A1 | 2/2002 | Mobin | 345/156 |
| 2002/0087225 A1 | 7/2002 | Howard | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0037180 A1 | 2/2003 | Madineni et al. | 709/321 |
| 2003/0069689 A1 | 4/2003 | Ihara | |
| 2003/0074590 A1 | 4/2003 | Fogle | |
| 2003/0112325 A1 | 6/2003 | Boyden et al. | 348/14.16 |
| 2003/0122874 A1 | 7/2003 | Dieberger | |
| 2003/0131148 A1 | 7/2003 | Kelley et al. | 717/101 |
| 2003/0227471 A1 | 12/2003 | Eglit | |
| 2004/0114032 A1 | 6/2004 | Kakii | 348/14.08 |
| 2004/0141012 A1 | 7/2004 | Tootill | 345/827 |
| 2004/0155956 A1 | 8/2004 | Libbey | 348/14.16 |
| 2004/0177361 A1 | 9/2004 | Bernhard et al. | 719/321 |
| 2004/0222977 A1 | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 | 11/2004 | Bear | 713/300 |
| 2004/0240167 A1 | 12/2004 | Ledbetter et al. | 361/683 |
| 2004/0240650 A1 | 12/2004 | Bear | 455/426.1 |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | 713/1 |
| 2005/0182822 A1 | 8/2005 | Daniel | |
| 2006/0007051 A1 | 1/2006 | Bear | 345/1.1 |
| 2006/0048062 A1 | 3/2006 | Adamson | |
| 2006/0061516 A1 | 3/2006 | Campbell | |
| 2006/0130075 A1 | 6/2006 | Rhoten | 719/328 |
| 2006/0164324 A1 | 7/2006 | Polivy | 709/206 |
| 2006/0284787 A1 | 12/2006 | Bear | |

FOREIGN PATENT DOCUMENTS

| | | |
|---|---|---|
| EP | 0777394 A1 | 6/1997 |
| EP | 000816990 | 1/1998 |
| EP | 0838934 A1 | 4/1998 |
| EP | 0772327 A3 | 2/1999 |
| WO | WO9602049 A1 | 1/1996 |

OTHER PUBLICATIONS

U.S. Appl. No. 11/837,302; Real-Time Communications Architecture and Methods for use with a Personal Computer System; filed Aug. 10, 2007.

Oxford on-line dictionary, http://dictionary.oed.com/entrance.dtl, Oxford University Press 2007, on the definition of the woed "Physical" under lll/7b.

OA mailed Aug. 8, 2007 cited in related case U.S. Appl. No. 10/996,371.

OA mailed Jul. 31, 2007 cited in related case U.S. Appl. No. 10/677,084.

OA mailed Jul. 27, 2007 cited in related case U.S. Appl. No. 10/996,557.

OA mailed Jul. 30, 2007 cited in related case U.S. Appl. No. 10/430,369.

OA mailed Jul. 6, 2007 cited in related case U.S. Appl. No. 10/429,943.

NOA mailed Sep. 7, 2007 cited in related case U.S. Appl. No. 10/429,931.

U.S. Appl. No.: 11/559,821, filed Nov. 14, 2006.

U.S. Appl. No. 11/685,014, filed Feb. 12, 2007.

* cited by examiner

| | BLUE (Information) | GREEN (Activity) | AMBER (Holding) | RED (Attention) | White (Life Status) |
|---|---|---|---|---|---|
| Power | n/a | "Powered Up" | "Powered Down" (Standing By) | Hardware Problem | Alive |
| Security | n/a | Logged In | n/a | Locked Out | n/a |
| Media | n/a | Playing | Paused or Muted | Recording | n/a |
| System Status (Health/Diag/Alerts) | n/a | Healthy | Non-Urgent Alert | Software Problem | n/a |
| Notifications (Email, Vmail, Call) | Message | n/a | n/a | Priority Information | n/a |
| "Calls" | Chat (Text and Ink) | Talking (Voice and Video) | Dial Tone or On Hold | Ringing (Voice and Video) | n/a |

FIG. 11

| | BLUE (Information) | GREEN (Activity) | AMBER (Holding) | RED (Attention) | White (Life Status) |
|---|---|---|---|---|---|
| Steady (Persist) | Information Present; Chat in Progress | "Powered up;" Voice Line open; Camera in Use User Available | "Powered down;" Call Muted; Volume Muted; Do Not Disturb | Attention Required; System Locked; Media Recording | Awake |
| Fast Blink (Change Up) | New Message | "Powering Up" Call Connecting | New System Alert | New Priority Information | n/a |
| Slow Blink (Change Down) | n/a | Full Shutdown | "Powering Down" (to standby) | Emergency Hibernation | n/a |
| Wink (Invite) | Incoming Chat (text and ink) | n/a | n/a | Incoming Call (Voice and Video) | n/a |
| Flash (Remind) | n/a | n/a | Call Holding | n/a | Resting |

FIG. 12

NOTIFICATION LIGHTS, LOCATIONS AND RULES FOR A COMPUTER SYSTEM

CROSS-REFERENCE TO RELATED APPLICATIONS

The present invention is related to the following copending U.S. Patent Applications filed concurrently herewith, assigned to the assignee of the present invention, and hereby incorporated by reference in their entireties:

"Method and System for Auxiliary Display of Information for a Computing Device,"U.S. Pat. No. 7,221,331, filed May 5, 2003 and issued May 22, 2007;

"Real-Time Communications Architecture and Methods for use with a Personal Computer System," Ser. No. 10/429,905, filed May 5, 2003;

"Record Button on a Computer System," Ser. No. 10/429,904, filed May 5, 2003;

"Method and System for Standby Auxiliary Processing Of Information for a Computing Device," U.S. Pat. No. 7,240,228, filed May 5, 2003 issued Jul. 3, 2007;

"System and Method for Activating a Computer System;" Ser. No. 10/430,369, filed May 5, 2003;

"Computer System with Do Not Disturb System and Method," Ser. No. 10/429,903, filed May 5, 2003;

"Computer Camera System and Method for Reducing Parallax," Ser. No. 10/429,943, filed May 5, 2003; and "Control and Communications Panel for a Computer System," Ser. No. 10/429,933, filed May 5, 2003.

FIELD OF THE INVENTION

The invention relates generally to computer systems and communicating information to computer system users.

BACKGROUND OF THE INVENTION

With computer systems, alerts in the form of prompts, dialogs and the like often appear on the display to tell the user something specific, such as a warning or reminder. Typically this is accompanied by some audio data to draw the user's attention to the alert. Some alerts fade away, while others require that the user specifically dismiss them to ensure that the alert was not missed while the user was away.

People can also receive information in other ways, often without consciously recognizing that they are doing so. This is particularly true when nothing unusual is occurring; the data is subconsciously noted, mentally processed as normal, and then effectively discarded, or at least not brought to conscious attention. However, when something unusual is occurring, such as a light illuminated in one color when normally it is lit another color, or a blink or flash of a light when normally the light is steady, the unusual data that is being conveyed will gather attention. Over time, users become trained to intuitively recognize the meaning of such information when is important to them, or occurs frequently enough that the information is not really unusual, just different.

Except for specific alerts (or the absence of them), computer users receive very little useful information about what is actually going on in the computer system. Some of the scarce information that users do receive is whether the various external components of a computer system are receiving power, typically as indicated by an LED on each component. Keyboards typically have indicators for the NumLock and Caps Lock states, (and for Scroll Lock), and disk drives tend to have an LED and/or make an audible sound when being accessed so that the user knows that any delay is normal I/O delay. A few other basic indicators might be provided, such as a battery charge level indicator on a laptop, a media player LED that lights when in use, and so on. These indicators may provide some useful information to the user, but it is very limited.

Moreover, not only are there few external indicators for users, each providing very limited information, but there is no general consistency on what a given indicator means. For example, one component may use green for powered-up and amber to indicate receiving power but in some rest state, while another component may use amber whether powered up or sleeping, and not lit at all when switched off. Further, the indicators are located on each given component, scattered around the computer system, e.g., the power light is typically on the main housing, the media player light is on the drive, and/or the main housing, often making it hard for users to see without consciously making an effort to look for it, such as on a floor-standing personal computer.

What is needed is a method and system in the form of indicators that provide useful information to computer users for many types of state information, in a manner that is consistent as to their general meanings in the context of each indicator's component or device and with one another to a general extent. It also would be beneficial if the indicators were positioned so as to be easily visible without specifically looking for them, at locations that are logical and allow the state information to be subconsciously observed.

SUMMARY OF THE INVENTION

Briefly, the present invention provides indicators such as lights (e.g., LEDs) that provide notifications to computer users while following generally consistent rules, to provide users with a consistent computing experience with respect to computer-related state information. The locations of visible indicators may be varied to an extent between implementations, but are generally in sensible locations and/or grouped in some manner so as to facilitate observance.

For visible indicators, the rules are based on colors and/or illumination patterns (e.g., based on frequency and/or duty cycle) that provide a user with important computer-related information, which the user will intuitively learn the meaning of over time, at least for those indicators that are important to that particular user. Other visible information (e.g., acceleration or deceleration of pulse frequencies, bright versus dim intensities and so forth) are also feasible criteria for conveying information to a user. Audible indicators may be similarly varied to provide more granular information than simply on or off, e.g., in tone, timbre, volume, and/or patterns, as can tactile information, e.g., pressure, vibration frequency, vibration patterns and so forth.

In one implementation, colors are assigned to types of information, e.g., blue for informational-related data such as notifications and calls, green for activity-related information such as power or operational behavior (e.g., a drive accessing data), amber for holding or non-urgent warning type data, red for attention and important notifications, and white for life state data. These colors may be combined in various illumination patterns, e.g., a red blink over a steady amber light on the same LED may indicate two things to a user.

Illumination patterns also provide meaning to a user, such as steady for persistent type data, fast blinking for new information or changes in one direction (e.g., starting up), and slow blinking for changes in the opposite direction (e.g., shutting down). Other patterns include winking (e.g., occasionally repeating double flashes) for invitation-related data, and/or a flash (e.g., occasionally repeating one-shot flashes) for reminders and the like. The patterns can have other meanings that make sense in the context of what the respective indicator is indicating, e.g., a white flash can mean a device is in a resting state.

In addition to colors and rules, the locations for the lights may be defined to be in easily viewable and/or sensible locations with respect to their purpose. In one implementation, many or all of the visible indicators may be grouped together on a single control panel for rapid viewing. In another implementation, the visible indicators may be grouped by function, e.g., for buttons on the keyboard, the lights may be next to the buttons, while for general purpose indictors such as system power state and notifications that may not have buttons, or at least not buttons that are regularly pressed, the indicators may be located at a more visible location, such as on the frame of a monitor.

Other advantages will become apparent from the following detailed description when taken in conjunction with the drawings, in which:

BRIEF DESCRIPTION OF THE DRAWINGS

FIG. 11 is a representation of a table of data describing state-based colors for various indicators in accordance with an aspect of the present invention;

FIG. 12 is a representation of a table of data describing state-based colors and various illumination patterns for conveying information in accordance with an aspect of the present invention;

DETAILED DESCRIPTION

Exemplary Operating Environment

Figure 1:
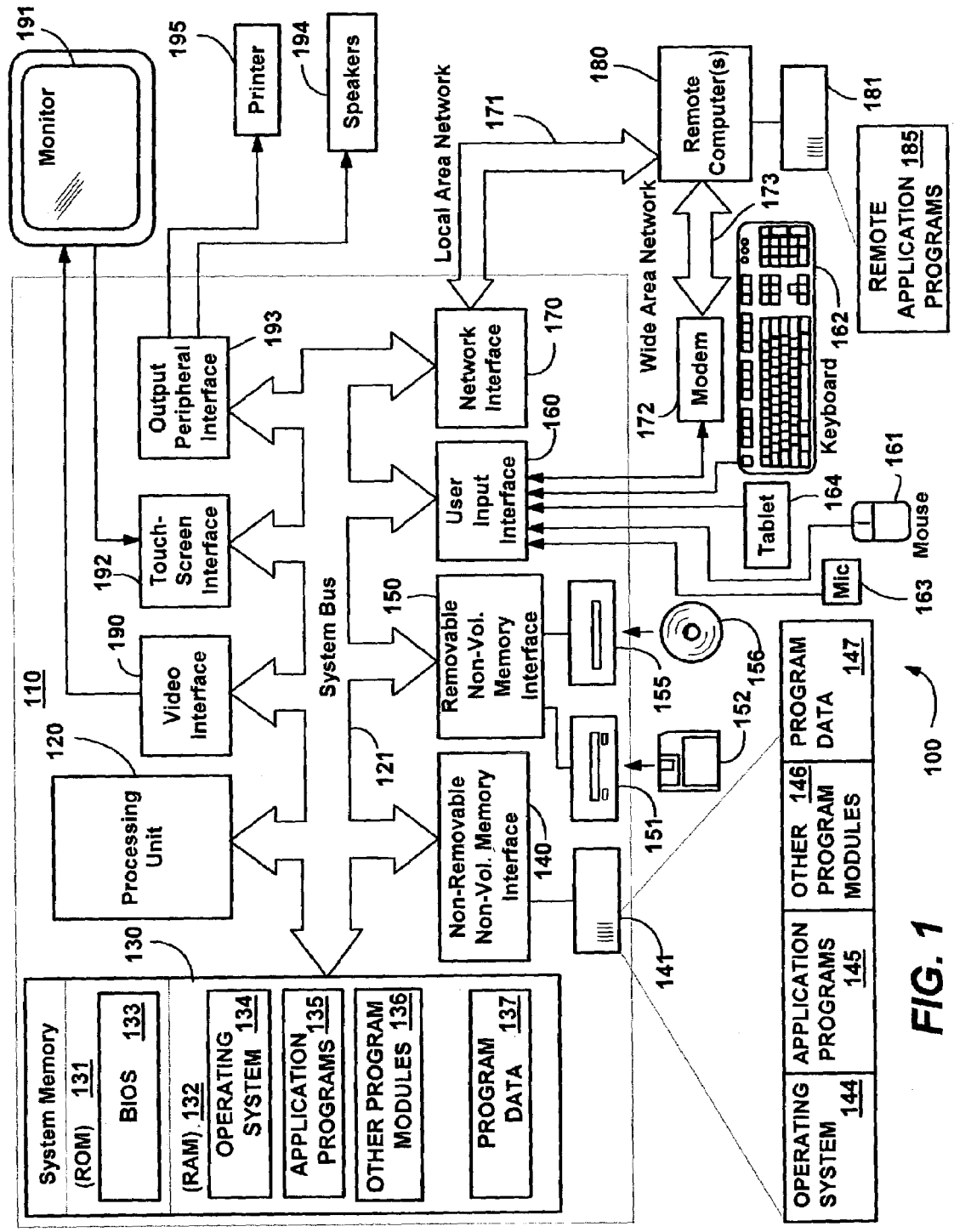
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating; system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Notification Lights, Locations and Rules

The present invention is generally directed towards providing state information related to a computer system to users. Note that the invention will primarily be described with indicators in the form of visible lights, however anything capable of being sensed may be used as an indicator, e.g., audio or tactile output. The state may include conventional information such as power state, however other information not traditionally thought of as related to a computer, such as state information related to telephone calls may be provided. As such, the computer may be generally arranged as a central communications point for multiple communications-related mechanisms and programs. Further, as will be understood, the various communication channels, controls, indicators and scenarios described herein are only examples, and there are many others to which the present invention will apply.

Figure 2:
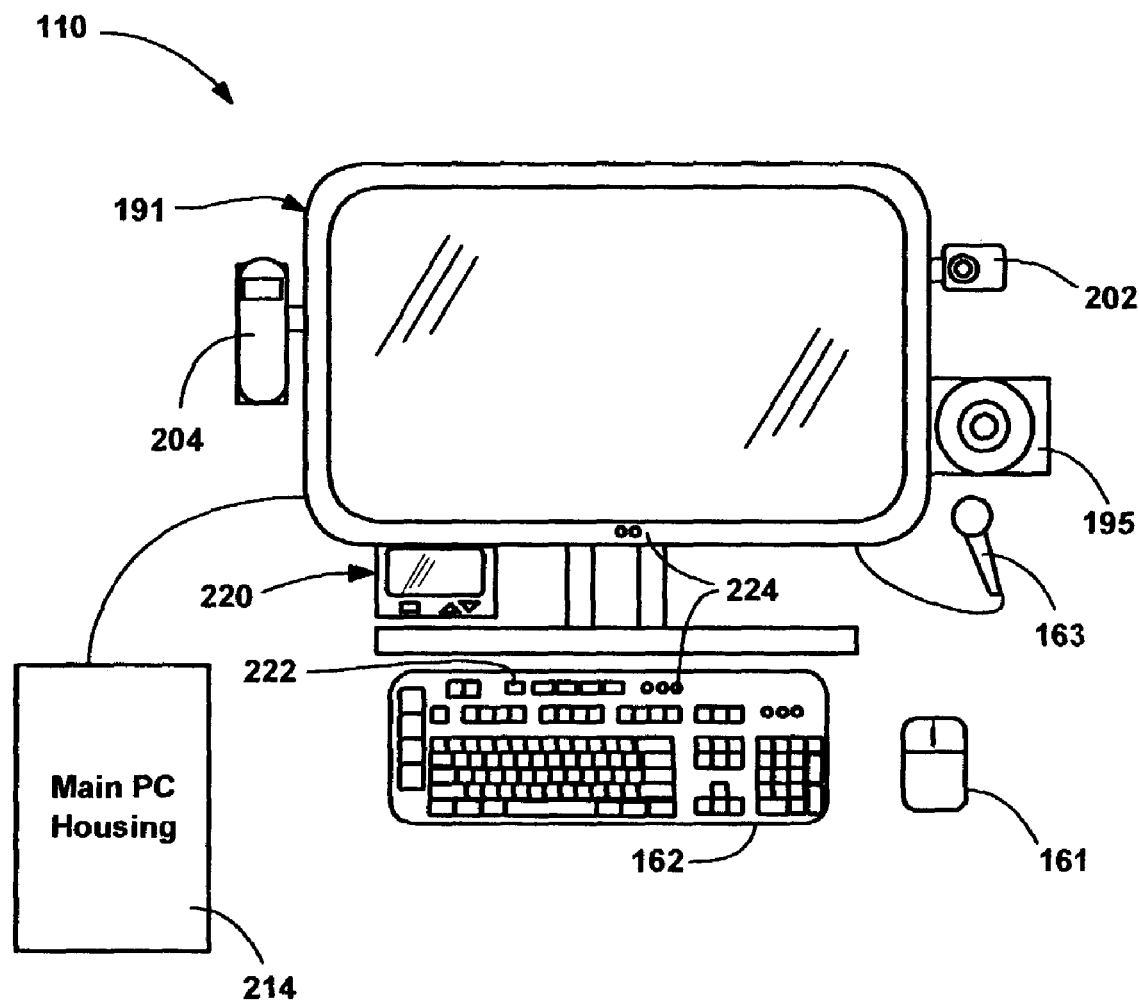
FIG. 2 is a general representation of a computer system arranged with indicators for various computer-related devices to provide information in accordance with an aspect of the present invention.

Turning to FIG. 2 of the drawings, there is shown a computer system, such as the computer system 110 of FIG. 1, in which various communications-related devices and other input output devices are integrated. For example, the computer system 110 includes a monitor 191 having an attached camera 202, an attached telephone (e.g., handset) 204, and an attached speaker 206, which along with a microphone 163, may function as a speakerphone. Other devices not separately represented in FIG. 2 include mobile communications devices such as a cellular telephone or other mobile computing device capable of connecting in some way (e.g., by wired cradle or wireless technology) with the computer system. Although shown as individual devices in FIG. 2, it is understood that any or all of these devices, such as the speaker 195 and microphone 163, may be combined into a unitary assembly, or built into other devices, such as the monitor 191. In any event, each of these devices may be present and if so are connected directly or indirectly by a wired or wireless connection to interfaces at the main PC housing 214 (containing at least the motherboard, but also typically containing some non-volatile storage).

Also represented in FIG. 2 is an auxiliary display device 220. The auxiliary display 220 is typically small (relative to the main display screen 191), and may be incorporated into the control and communications panel's assembly. As is understood, the control panel need not have the auxiliary display combined with it, and there may not be an auxiliary display in a given implementation, or the auxiliary display may be located elsewhere. FIG. 2 further shows non-conventional buttons on the keyboard, and non-conventional LED indicators 224 on the keyboard and monitor, in keeping with the present invention as described below.

Figure 3:
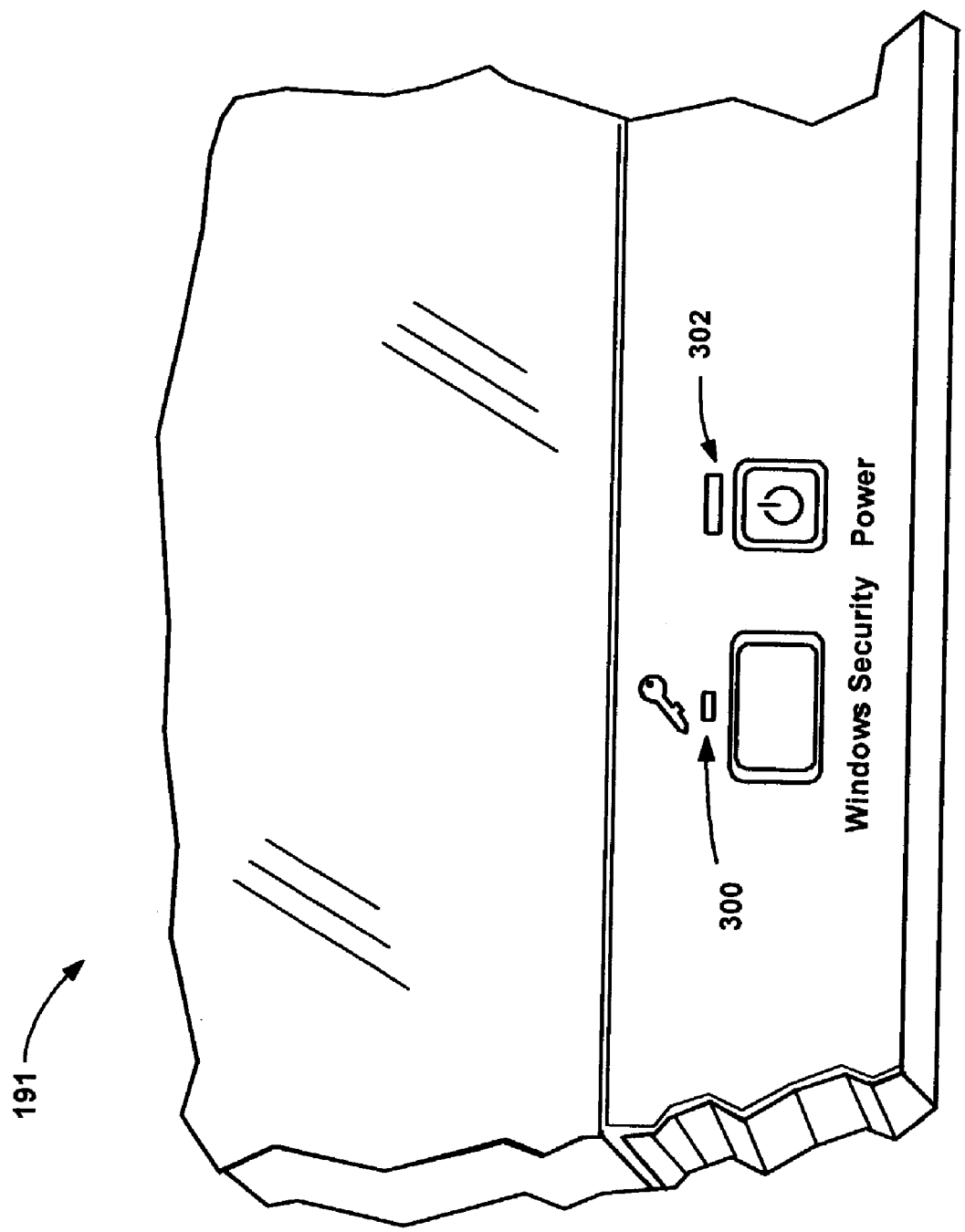
FIG. 3 is a partial representation of a computer monitor having controls and indicators for power and security located thereon in accordance with an aspect of the present invention.

In accordance with an aspect of the present invention, as generally represented in FIG. 3, state information is provided for non-traditional types of information and/or in non-traditional locations. For example, on the display monitor 191 security-related information and the power state (for the system, not simply the monitor) are shown as having indicators 300 and 302, respectively, as well as having accompanying controls. As described below with particular reference to FIGS. 11 and 12, the indicators 300 and 302 provide such system state information (e.g., power mode, logged in or logged out) to users in a manner that can convey more than simply two states.

In general, the security-related information and the power state of the system are not something that are frequently changed, and thus visibility rather than easy access to their corresponding controls may be emphasized, hence the location on the monitor 191 instead of on the keyboard 162, for example. As will be understood, however, on a given implementation these indicators and any accompanying controls may be located virtually anywhere that is practical. Further, it should be noted that the indicators are shown as being near a corresponding control, but may be located elsewhere, or even incorporated into the control, e.g., the LED may be inside a button.

Figure 4:
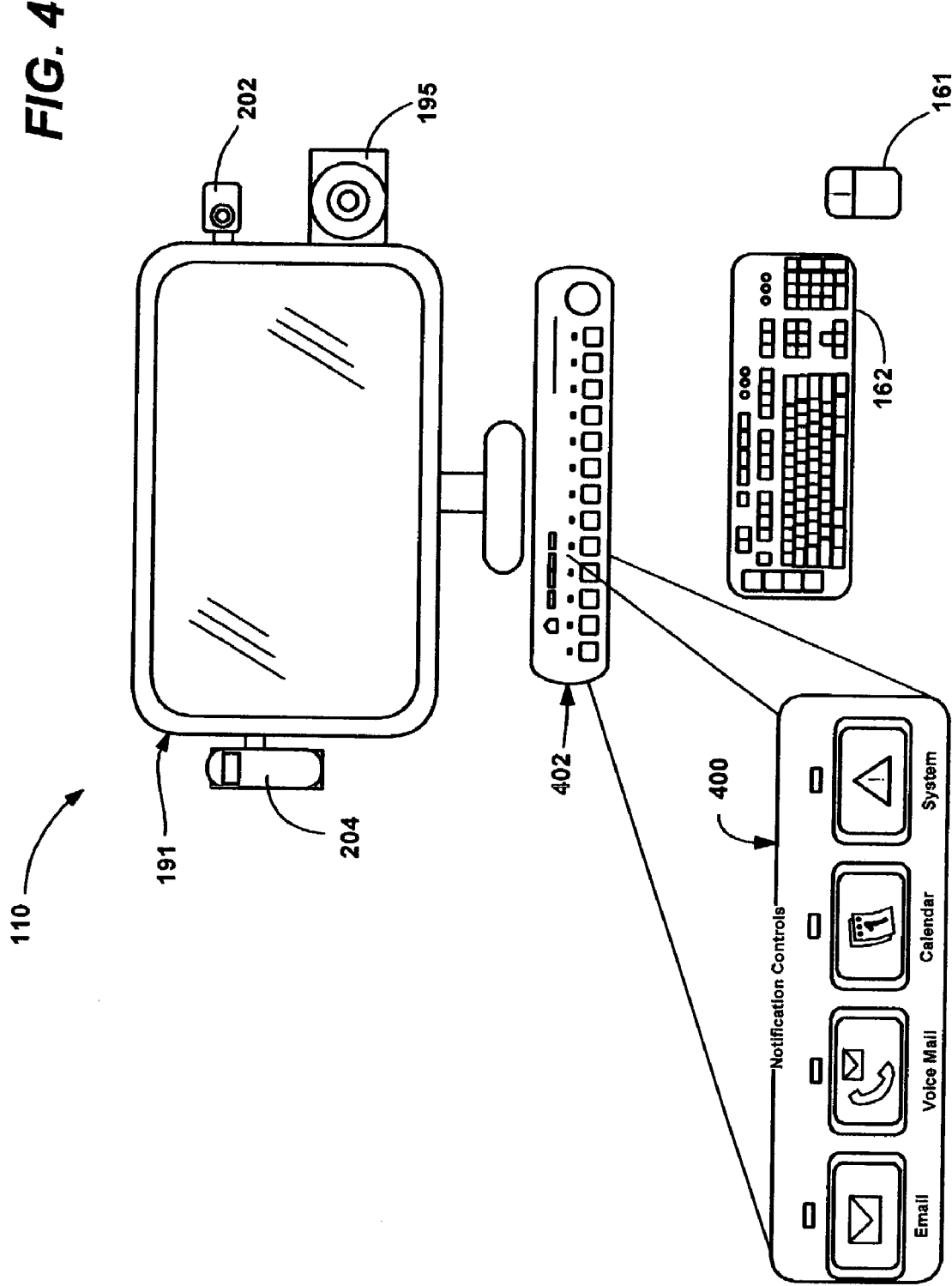
FIG. 4 is a general representation of a computer system arranged with a control and communications panel having notifications controls and indicators (shown magnified) in accordance with an aspect of the present invention.

FIG. 4 shows another type of indicators and corresponding controls, namely notification-related controls/indicators 400. In this particular example, these controls/indicators 400 are provided among other controls/indicators on a control panel 402, which may be located in various places, as described in the related United States patent application entitled "Control and Communications Panel for a Computer System." It should be understood, however, that such notification-related controls and indicators 400 may be located separately and/or elsewhere, such as on the monitor 191 or keyboard 162. For example, easy physical access to these controls is one design consideration because they may be used often, and thus a keyboard would be another likely place to incorporate notification-related controls and indicators. Note that in an implementation that had a control panel, the security and power indicators/controls would likewise typically reside on the control panel 402, independent of whether they were also present on the monitor and/or keyboard.

Examples of notification-related controls 400 include controls for accessing email, voicemail, calendar and system-related notifications and state (such as general health of the system). Other notification controls not shown that are equivalent include controls related to instant messaging and the like. Note that telephone-call related controls are somewhat related to notifications, but in these examples are provided in their own group or groups.

Figure 5:
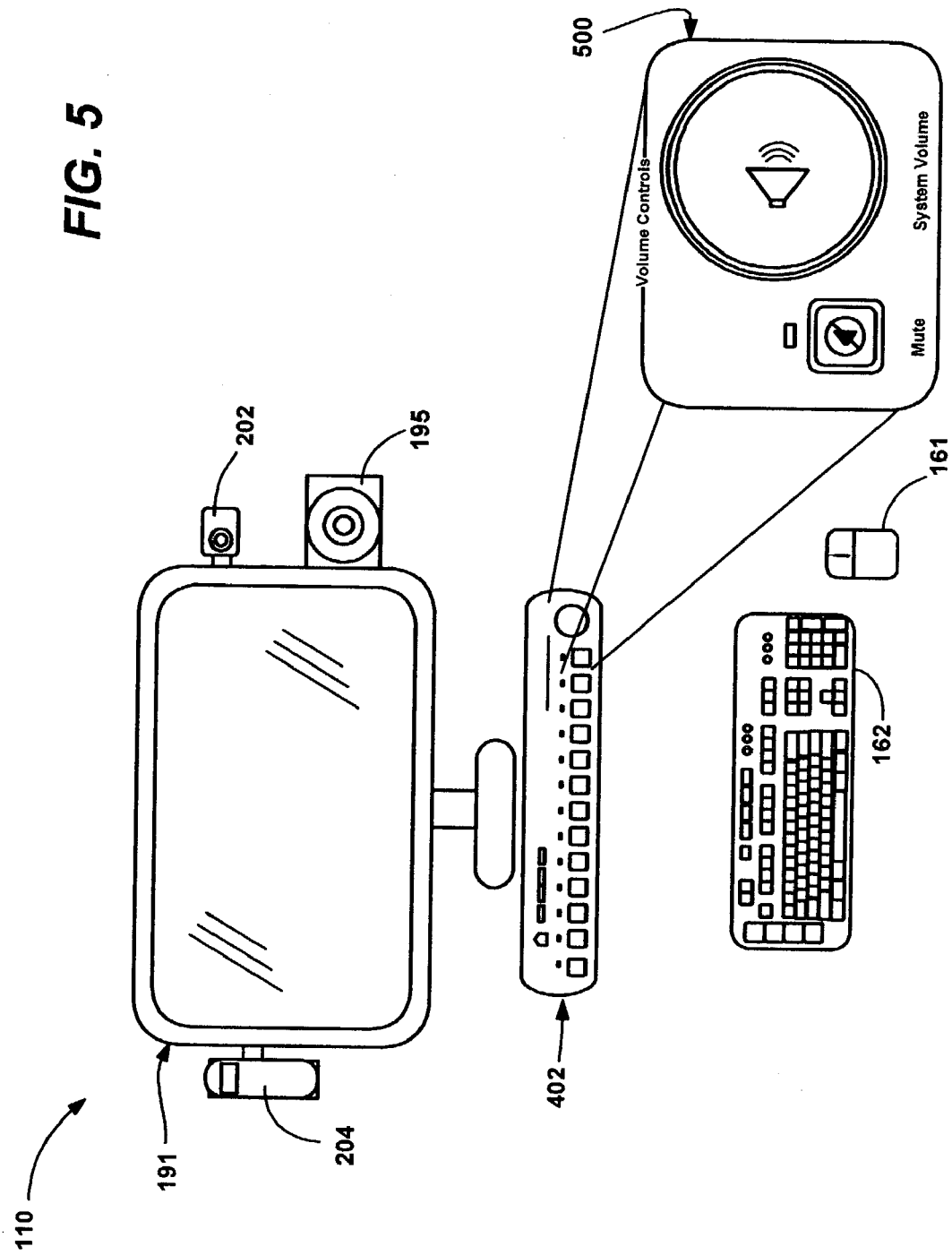
FIG. 5 is a general representation of a computer system arranged with a control and communications panel having volume controls and an indicator (shown magnified) in accordance with an aspect of the present invention.

FIG. 5 shows other controls and an indicator set 500 on a control panel embodiment 402, namely for audio volume control and visual feedback. A mute button and indicator are shown, as is a volume knob. Note that other volume control mechanisms such as up and down buttons or a slider bar are equivalent. Further, note that although not shown, an indicator or set of indicators may accompany the volume control, e.g., a line of LEDs that illuminate sequentially as the volume level is increased.

Figure 6:
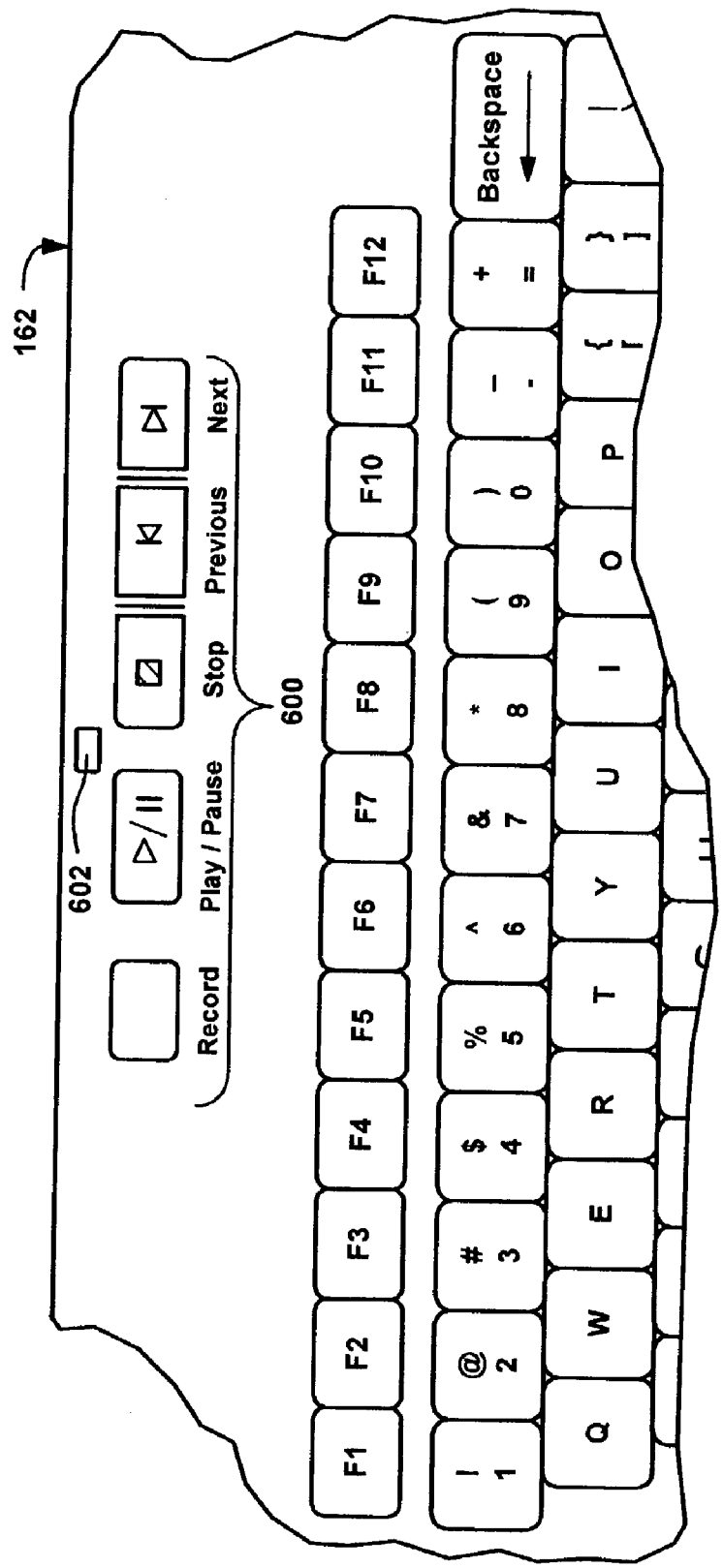
FIG. 6 is a partial representation of a computer keyboard having transport controls and indicators positioned thereon in accordance with an aspect of the present invention.
Figure 9:
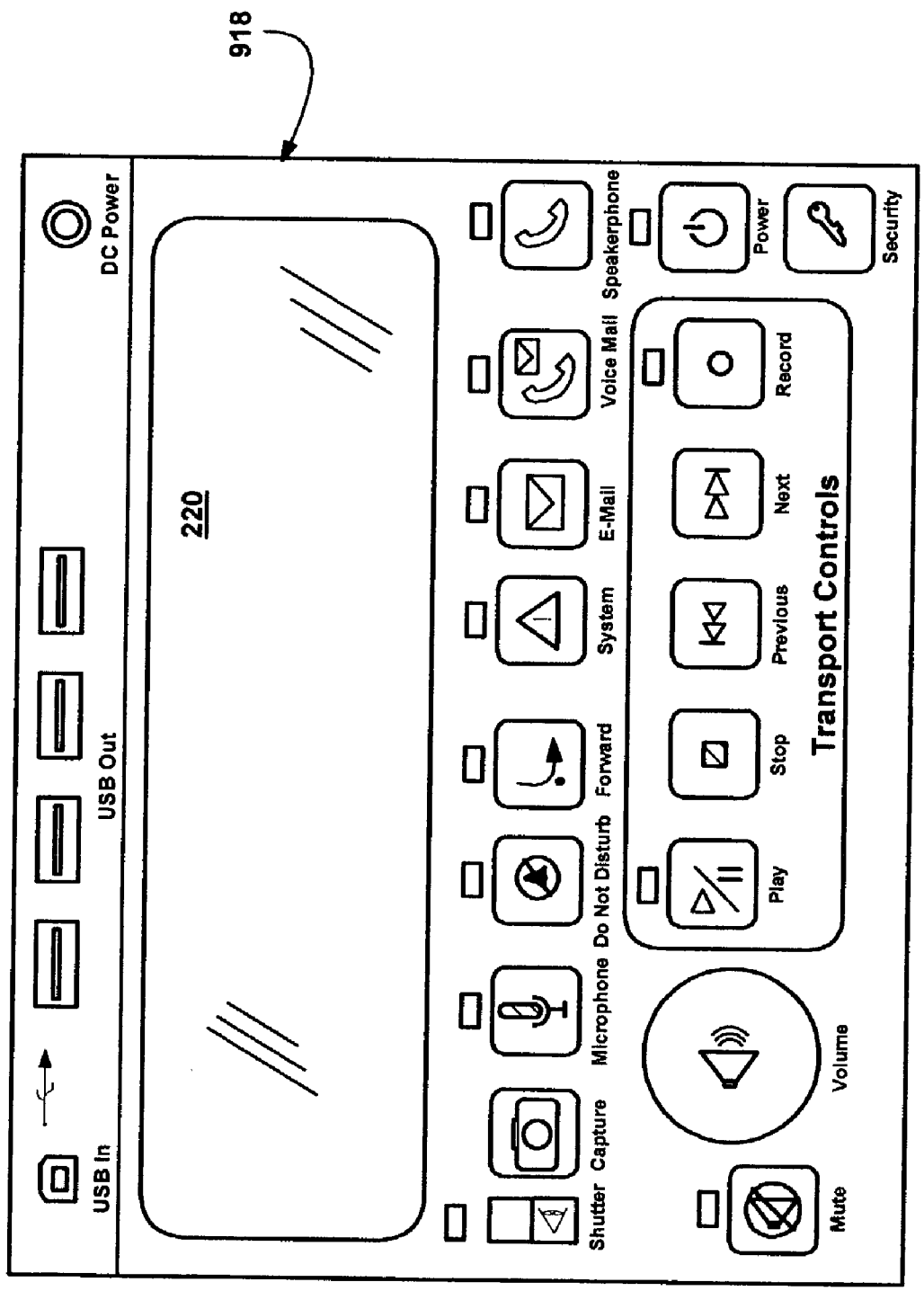
FIG. 9 is a general representation of a computer system arranged with a control and communications panel having controls and indicators thereon in accordance with an aspect of the present invention.

FIG. 6 is a representation of (part of) a computer keyboard 162 in which transport controls 600 have been provided on the top of the keyboard. Indicator 602 is provided in association with the transport controls 600. The record button is a special type of transport control, as described in related patent application entitled "Record Button on a Computer System." As will become apparent, the transport controls and any associated indicator or indicators may be provided on a control panel, (e.g., FIG. 9), or elsewhere on the system (e.g., by the media player) or in alternative locations on the keyboard. Further, it can be appreciated that multiple indicators may be provided with transport controls, e.g., one for record, one for play and so forth as desired.

Figure 7:
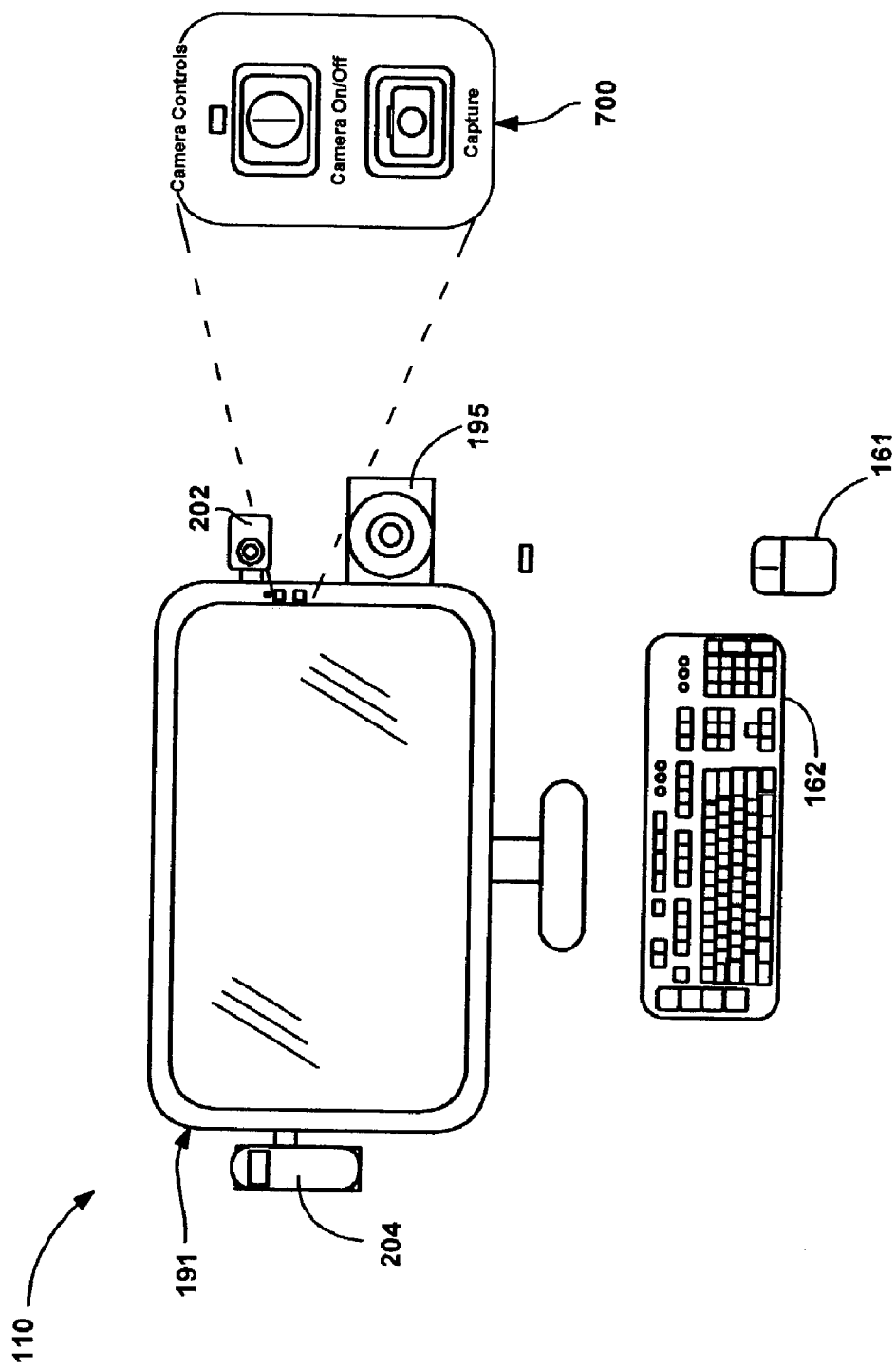
FIG. 7 is a general representation of a computer system arranged with a monitor having camera controls and an indicator (shown magnified) in accordance with an aspect of the present invention.

As generally represented in FIG. 7, camera state information is provided in association with camera controls 700, such as on the frame of the display monitor 191 by the camera 202. In the example implementation of FIG. 7, the camera controls and state indicators are provided near the camera so that the user will see the state while looking towards the camera. Alternatively or in addition to these controls, the keyboard or a control panel, or the camera housing itself may also provide a suitable location for the camera controls and indicator. Note that if the camera housing was used, the controls and indicators would move around with the camera, which would be like a conventional camera except that the operating system would actually be controlling the indicator and interpreting the controls.

Figure 8:
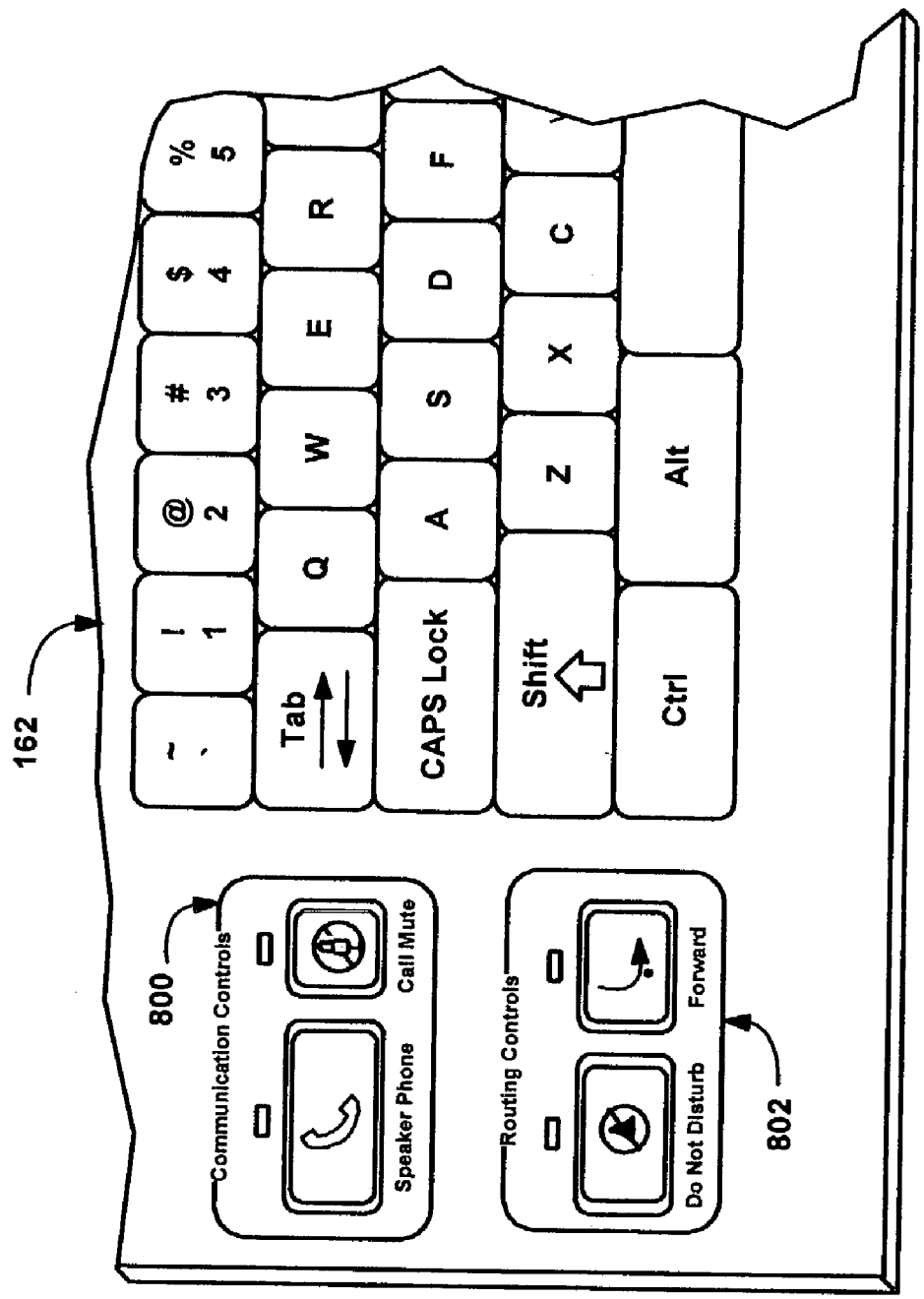
FIG. 8 is a partial representation of a computer keyboard having communication and routing controls and indicators positioned thereon in accordance with an aspect of the present invention.

FIG. 8 shows communication controls/indicators 800 and routing controls/indicators 802 arranged on a keyboard 162. As can be readily appreciated, such controls may be frequently used, and thus emphasis may be given to the ease of reaching them instead of their being more visible but difficult to reach. Communication controls activate (or deactivate) a speakerphone mechanism (and/or other possibly mechanisms such as a headset or handset, not shown) for calls received at the computer system, and can also mute audio. Note that unlike conventional computer systems, the computer system may serve as a communications center, as described in related United States patent application entitled "Real-Time Communications Architecture and Methods for use with a Personal Computer System."

Routing controls may place the entire computer system into a do not disturb mode with respect to received communications, including telephone calls, instant messages, emails and other alerts, as described in related United States patent application entitled "Computer System with Do Not Disturb System and Method." Communications may also be forwarded. In keeping with the present invention, state indicators can convey these states to the user, along with other communications-related state data, such as a call holding. Further, as described below, the state indication may be the general illumination of the computer system (or at least the monitor) as a whole, rather than only indicated via a single LED.

The various controls and indicators may be grouped logically and positioned in various locations, such as near their related device, for ease of use, or for visibility. Alternatively, at least some of the controls and indicators may be grouped on a communications panel, such as the communications panel 918 of FIG. 9. The buttons and indicators may be repeated as well, but one advantage of the control panel 918 is that a single point of control and a single location to view state is provided.

Figure 10:
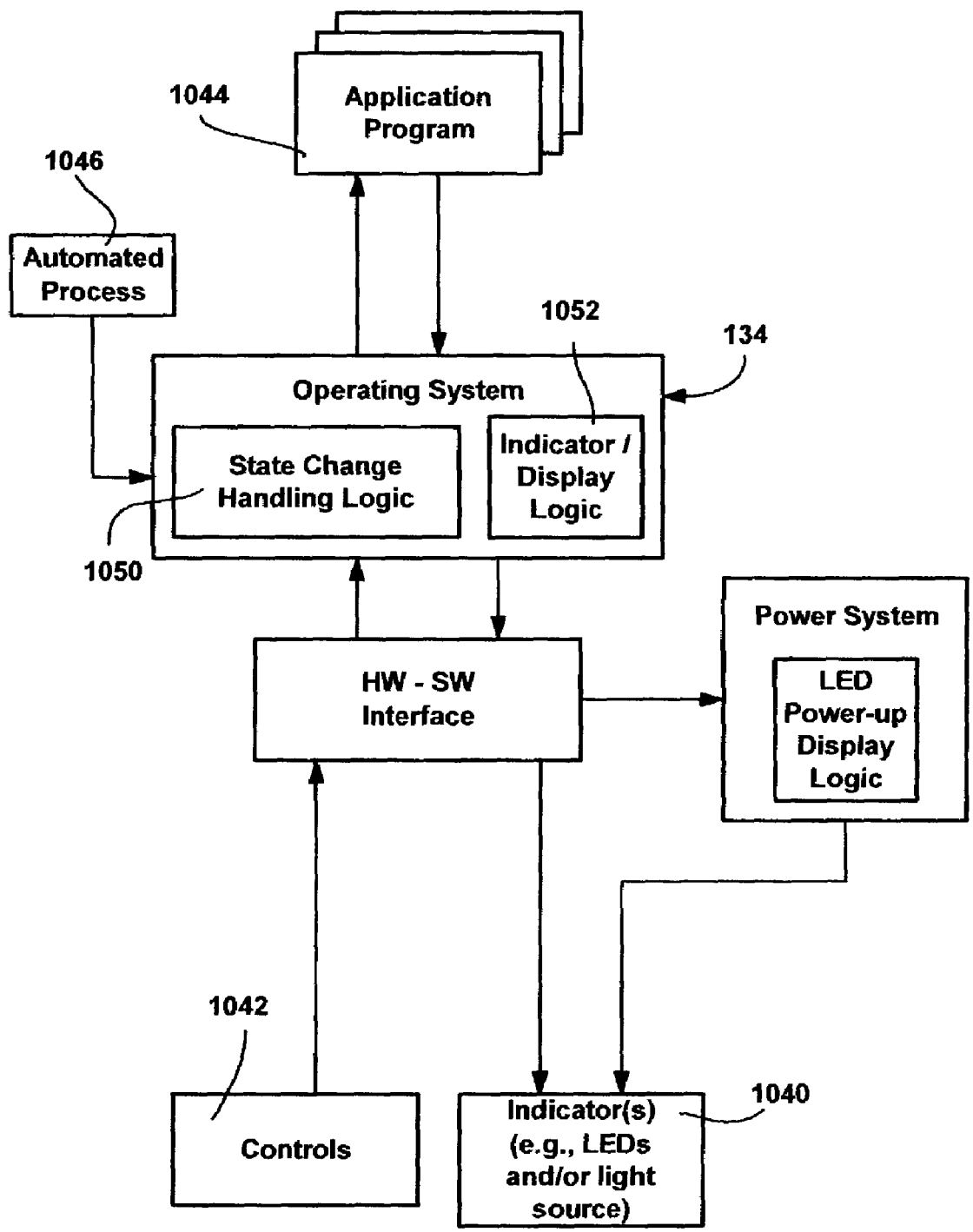
FIG. 10 is a block diagram representing various components for controlling state and state indicators in accordance with an aspect of the present invention

FIG. 10 shows how the indicators 1040 are controlled to display state information. In general, state changes or the like in controls 1042, or via application programs 1044 or automated processes 1046 are provided to the operating system 134, along with data that identifies the indicator. Via state change handling logic 1050, the operating system 134 then acts in the current context corresponding to change. This may include generating one or more hardware or software events or commands, such as to launch an application program when needed, lower the system volume, provide a log-in screen if in a locked mode or log a user out and enter a locked mode if operating, and so forth.

The operating system 134 controls the indicators 1040 as described below above via indicator display logic (rules) 1052 to convey rich information to the user. Note that the indicators need not be LEDs or other visible display mechanisms such as the auxiliary display, but may include any type of mechanism that outputs information that is capable of being sensed by a user, including visual, audible and tactile output. Each of the indicators may be related to one of the controls, and thus each indicator may be incorporated into or positioned proximate its corresponding control. Other indicators unrelated to any controls may be included in the control and communications panel 1018. Note that the computer system need not be fully operational for (at least some of) the controls of the control and communications panel and/or the indicators to work in accordance with the present invention. Indeed, some or all of the controls may still work when the computer is powered down, at least to a default extent or to an extent configured by a user. Thus, a secondary processor or the like may control the indicator output when the operating system is not available. To handle the controls and communications in such a powered-down mode, the control handling logic may be loaded into executable non-volatile memory, operated with a secondary processor, and so forth, so that communication works as long as some power is available, even though the disk, main processor, main display, network card and/or other parts of the system are powered down. The BIOS or the like may handle power-up indicator operation.

Turning to a general explanation of the rules for controlling indicators, FIGS. 11 and 12 are data tables that generally describe the indicators and their operation with respect to color and illumination pattern to represent a current state. In general, the indicators have at least two components, a color component and an illumination pattern component that together convey useful, granular state information to a user. The components may be combined with other components, e.g., an indicator may have multiple patterns and/or colors interleaved with one another in some manner that conveys multiple sets of information, e.g., a red blink over a green steady light with an occasional amber wink is one of the many possible examples. As described below, the colors and patterns have meanings based on the context of the particular type of state information that is being displayed, e.g., red, steadily illuminated means the system is locked in the context of a security-related indicator, while red, steadily illuminated means that recording is occurring in the context of a media-related indicator. Both, however, use red to convey that some appropriate attention should be given to the system.

FIG. 11 describes the colors with respect to the type of indicators, while FIG. 12 describes the illumination patterns with respect to the colors, with the various indicators' behaviors described as appropriate for the color, pattern combination. Note that these colors and illumination patterns are only examples in one possible scheme; for example, color-blind people may choose a different scheme.

To this end, the behavior of the light including the color, intensity, brightness, any associations to sounds and lighting effects may be controlled and configurable through software and or the user preferences. For example, the light may be color component (e.g., RGB) based allowing the system to perform according to different user profiles, applications, and preferences. The behavior of the light including pulsing, blinking rate and frequency and intensity may also be controlled and/or configured programmatically. Other sensory information such as audio and tactile data may indicate different state events as well, and these may be configurable. However, in keeping with the present invention, whatever scheme is used should be generally consistent with respect to the types of data being conveyed, e.g., activity-related data would typically use the same primary indication (such as the same color) regardless of which component a given indicator was representing.

As represented in the example scheme of FIG. 11, the power button may be illuminated to one of four colors, namely green, amber, red and white, to represent powered up, powered down, a hardware problem, and alive states, respectively. Power-related "informational" data (blue) does not really apply, as any information about the power state (e.g., battery low) would be a system status alert. Other indicators such as for security state (logged in or locked out), media state, system status, notifications and "calls" (communications generally, not just voice) are readily apparent from FIG. 11, and will thus not be redundantly described herein, except that an example notification scenario will be provided below with reference to the state diagram of FIG. 13.

As represented in FIG. 12, the way in which these colors are presented to the user (illumination patterns) also convey information. For example, steady green means powered up, steady amber means powered down. As also apparent from FIG. 12, a fast blink of the power indicator while green indicates powering up. A slow green blink of the same power indicator indicates a full shutdown, a slow amber blink indicates powering down to standby, while a slow red blink indicates an emergency hibernation (e.g., battery power is critically low) is occurring.

As shown in FIGS. 11 and 12, in one implementation, colors are assigned to types of information, e.g., blue for informational-related data such as notifications and calls, green for activity-related information such as power or operational behavior, amber for holding or non-urgent warning type data, red for attention and white for life status data.

Thus, each indicator has an associated context, each color indicates a type of operation relative to that context, and each illumination pattern indicates further information. These colors may be combined in various illumination patterns. For example, consider a call holding (amber flash, FIG. 12) while the user is talking (green steady, FIGS. 11 and 12). In this situation, the "steady" green light will flash amber once, which is repeated on occasion (e.g., periodically).

In the example of FIGS. 11 and 12, for visible indicators, the rules are based on colors (FIG. 11) and/or illumination patterns (FIG. 12, e.g., based on intermittent illumination frequency and/or duty cycle) that provide a user with important computer-related information, which the user will intuitively learn the meaning of over time, at least for those indicators that are important to that particular user. Other visible information (e.g., acceleration or deceleration of pulses, bright versus dim intensity and so forth) are also feasible criteria for conveying information to a user.

As set forth in FIG. 12, illumination patterns also provide meaning to a user, such as steady for persistent type data, fast blinking for changes in one direction or new information, and slow blinking for changes in the opposite direction. Other patterns include winking (e.g., occasionally repeating double flashes) for invitation-related data, and/or flash (e.g., occasionally repeating one-shot flashes) for reminders and the like. The patterns can have other meanings that make sense in the context of what the respective indicator is indicating, e.g., a green fast blink of the power button means that the system is powering up, but a green fast blink of a "calls"-related indicator indicates a call is connecting. Other flash patters, such as a triple blink followed by a steady light of the same color can indicate something, e.g., as described in the example state diagram of FIG. 13 below, a notification light may blink blue three times when a normal priority email message arrives, followed by a blue light to indicate that information is available.

Audible indicators may be similarly varied to provide more granular information, e.g., in tone, timbre, volume, and/or patterns, as can tactile information, e.g., pressure, vibration frequency, vibration patterns and so forth.

Figure 13:
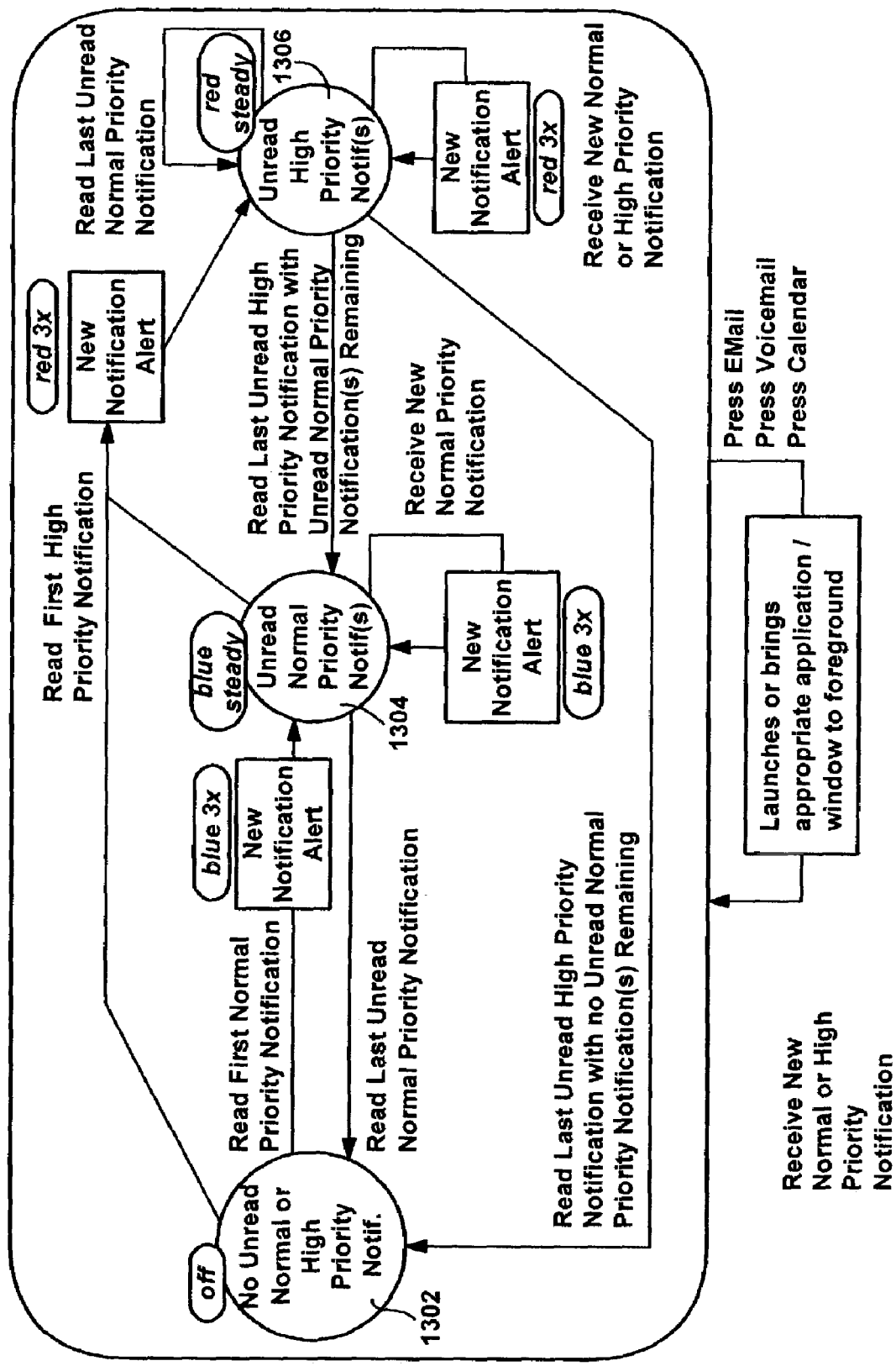
FIG. 13 is a state diagram representing transitions between states for notification-related states to describe indicator actions in accordance with an aspect of the present invention.

FIG. 13 presents a state diagram generally illustrating the states of operation for the use of a notification indicator. More particularly, the state diagram illustrates three states of operation applicable to each category of information and the actions associated with the transition between the states. Additionally, the behavior of the notification indicator is also illustrated for each state when notifications are received and when notifications are read. FIG. 13 will be described using email notifications as an example. As is understood, the colors and described flash operations are examples, and many alternatives are feasible.

Before the first email notification is received, the system is in state 1302 without any notifications to read. When a first email notification assigned a normal priority is received, the email notification indicator flashes blue three times (or some other number as in FIG. 12) and the system transitions to state 1304 where the notification indicator remains illuminated as a steady blue light. If a high priority email notification is next received, then the email notification indicator flashes red three times (for example) and the system transitions to state 1306 where the notification indicator remains illuminated as a steady red light. If the normal priority email notification was read, the system remains in state 1306 until the last high priority email notification is read. If a new normal or high priority email notification is received while the system is in state 1306, then the email notification indicator flashes red three times and the system remains in state 1306 with the notification indicator illuminated as a steady red light. After the last high priority email is read, the system transitions to state 1302, unless there are unread email notifications. If there are unread normal priority notifications, then the system transitions to state 1304 and the notification indicator changes to a steady blue light. Once the last normal priority email notification is read, the system transitions to state 1302 where the email notification indicator becomes unilluminated.

Each email notification may be read by bringing the email application program to the foreground on the monitor of the computer system and reading the email message that generated the notification. If the email application is not executing on the computer system, then the email application is first launched. This may be done in the traditional way via software interaction, or there may be a control button associated with the notification indicator which may be pressed to launch and/or bring the application program or system component to the foreground. In another exemplary embodiment, a key associated with the application program or system component on the keyboard 130 of the computer system 20 alternatively may be pressed.

Although FIG. 13 was described using email, it should be understood that other categories of information may be used by the present invention that may change the behavior of the notification indicators differently. For example, voice mail may have its own indicator that uses the same state diagram of FIG. 13, or a similar state diagram. As another example, the system status notification indicator (of the notification controls, 400 in FIG. 4) is associated with system status information. Rather than have the system status notification indicator unilluminated while in state 1302 when there are no system-related notification messages, this notification indicator may be illuminated as a steady green light to signify that the system is healthy. Although the notification indicators were described using a set of notification lights, those skilled in the art will appreciate that other types of notification indicators may be used. For instance, an audio indication may be generated to alert the user whenever a new notification is received, instead of or in addition to flashing the notification indicator.

In sum, the present invention thus provides a method and system for communicating various states or conditions of the computer system and/or its systems/subsystems to the user and/or other people within viewing range. Indicators embedded in a computer or computer peripheral products (including a control panel) convey the state information.

Figure 14:
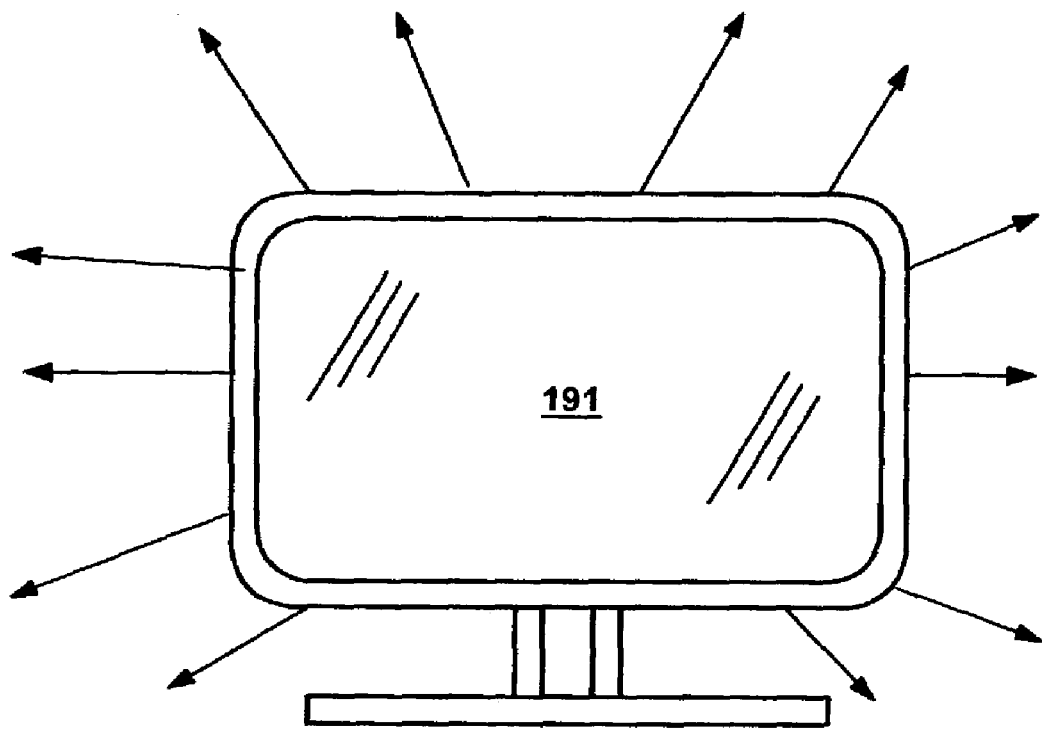
FIG. 14 is a representation of a computer monitor conveying information by emanating light in a generally outward direction.
Figure 15:
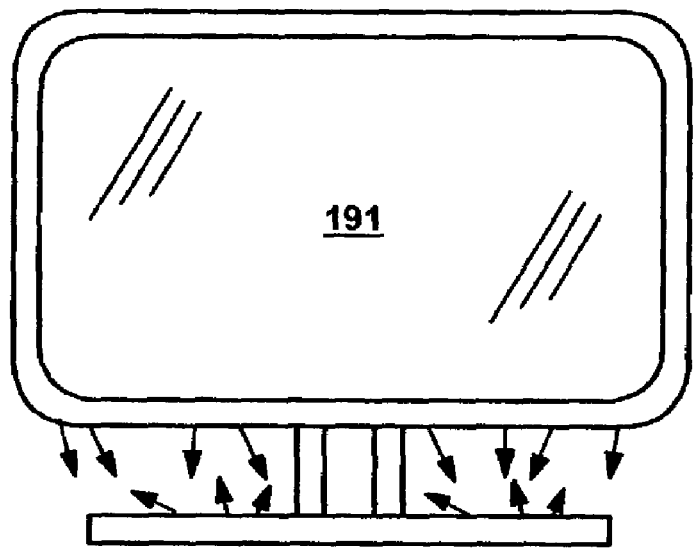
FIG. 15 is a representation of a computer monitor conveying different information relative to FIG. 14 by emanating light in a generally downward direction.
Figure 16:
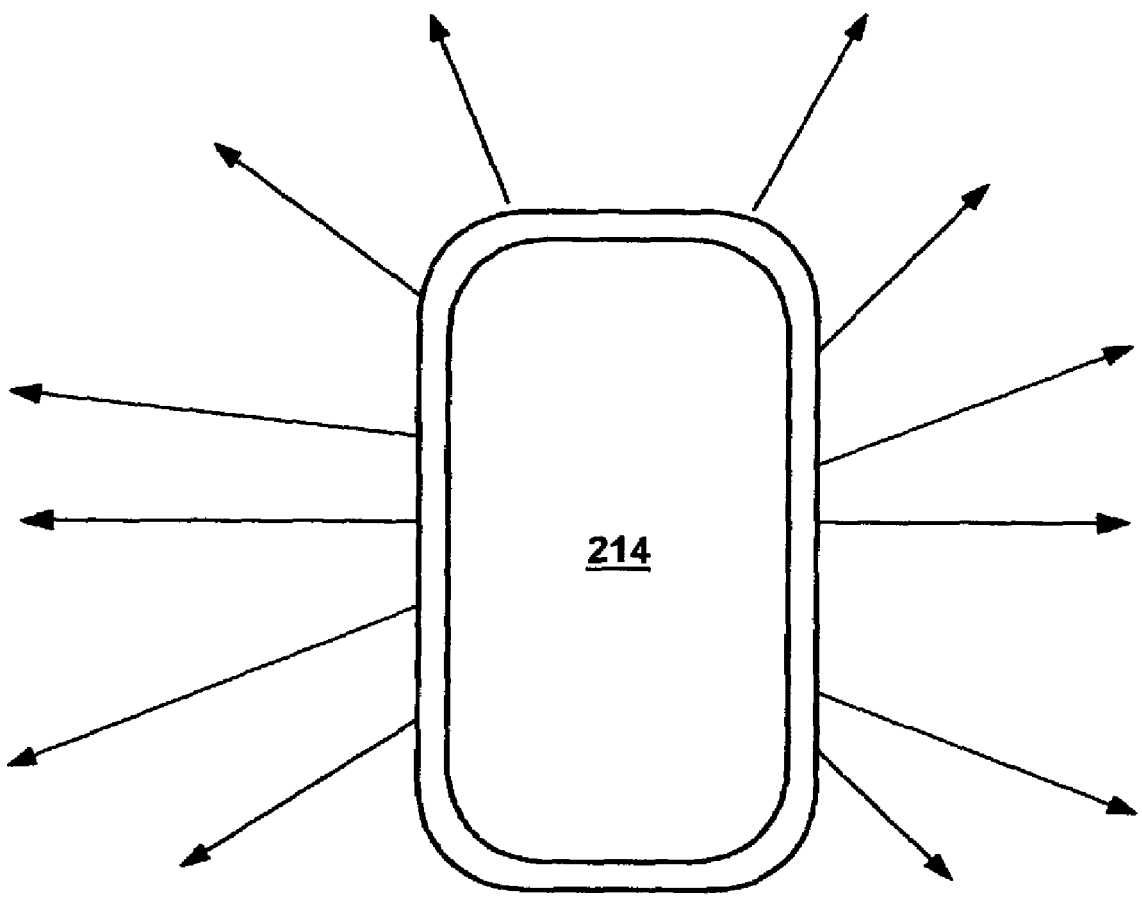
FIG. 16 is a representation of a computer housing conveying information by emanating light in a generally downward direction.

It should be noted that other types of lighting are feasible and may be alternatively implemented. By way of example, as represented in FIG. 14 by the arrows, a light emanating from a computer monitor bezel that is lit when the computer system is in standby mode communicates to a user that the computer system is ready for use. When the computer system is turned on or placed into use, the light diminishes from around the monitor and emanates from the base of the monitor and/or near the housing, indicating that processing and computing activity has been engaged and that the computer system is on, as in FIG. 15. The general lighting may be different colors, which need not remain constant but can vary over time for attractiveness purposes. The housing 214 can emanate light as in FIG. 16.

This same alternative light source (or sources) can be used (as an alternative or in addition to an LED indicator) to communicate alternative states of computer system use or activity including the do not disturb mode. In this condition, the light emanating from the base may works together with a do not disturb control button to indicate a shift in the way the computer is being used. For example, the user engages a do not disturb control to shift the state of the computer into a mode in which incoming notifications are selectively filtered and handled, (e.g., the do not disturb state may automatically directs incoming voice calls to a voice mail inbox, instant messages are answered in a way that informs the caller that the user is unavailable for IM discussions, email may auto-reply with a message indicating unavailability), as described in related United States patent application entitled "Computer System with Do Not Disturb System and Method. When so configured, selecting a not disturb mode causes the light emanating from the base to indicate to the user and other people around the user that the computer is now in a different use state.

A system alert can also be given by this alternative light source (and/or by an LED indicator), in which the light that is emanating works with the computer system to indicate activity. For example, the light source may notify users of various kinds of alerts, such as the printer being out of paper or jammed, when a connection is interrupted, when software updates are available, and/or other user specified alerts.

System health is another indication that may be given by this alternative light source such as to notify the users of the general health of the computer system, e.g., whether the computer system is functioning at it optimum. The light or indicator may give the user a more general awareness of the performance of the computer system, e.g., whether the memory is full, the processor is slowing down, a virus or bug in the hardware or software is compromising performance, the hard disk needs defragmenting, whether the user has enabled or disabled macros, whether the system is working at its optimum performance capability.

As can be seen from the foregoing detailed description, there is provided a set of indicators that provide useful information to computer users for many types of state information, in a manner that is consistent as to their general meanings in the context of each indicator's component or device and with one another. The indicators are positioned to convey information at locations that are logical and allow the state information to be subconsciously observed. The method and system of the present invention thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a subsystem comprising:
    a plurality of different indicators that each corresponds to a different item of a computer system and that each convey different information about a state of the computer system and the corresponding computer system item, wherein each one of the plurality of different indicators is individually associated with and includes a plurality of colors; and
    control logic that selects, for each of the plurality of different indicators, an appropriate one or more of the colors that are included with each indicator, as well as an illumination pattern for illuminating the appropriate one or more selected colors for each indicator and in such a way as to convey information about the state of the computer system and the corresponding item of the computer system.

2. The subsystem of claim 1 wherein the indicator outputs visible information.

3. The subsystem of claim 2 wherein the first operating component comprises color, and wherein the first data comprises at least one value that is used to output a corresponding color on the indicator.

4. The subsystem of claim 3 wherein the control logic selects the color from a set containing blue, green, amber, red and white.

5. The subsystem of claim 4 wherein the control logic selects blue to output informational-related state data to the selected indicator.

6. The subsystem of claim 4 wherein the control logic selects green to output activity-related state data to the selected indicator.

7. The subsystem of claim 4 wherein the control logic selects amber to output holding-related state data to the selected indicator.

8. The subsystem of claim 4 wherein the control logic selects red to output attention-related state data to the selected indicator.

9. The subsystem of claim 4 wherein the control logic selects white to output life status-related state data to the selected indicator.

10. The subsystem of claim 3 wherein the control logic selects the color from a set containing green, amber and red.

11. The subsystem of claim 1 wherein the selected indicator indicates a state of power of the computer system.

12. The subsystem of claim 1 wherein the selected indicator indicates a state of security of the computer system.

13. The subsystem of claim 1 wherein the selected indicator indicates a state of a media-related device of the computer system.

14. The subsystem of claim 1 wherein the selected indicator indicates a state of recording information by the computer system.

15. The subsystem of claim 1 wherein the selected indicator indicates a hardware problem in the computer system.

16. The subsystem of claim 1 wherein the selected indicator indicates a software problem in the computer system.

17. The subsystem of claim 1 wherein the selected indicator indicates that a communication is available at the computer system.

18. The subsystem of claim 1 wherein the selected indicator indicates a message available at the computer system.

19. The subsystem of claim 1 wherein the selected indicator indicates an incoming call to the computer system.

20. The subsystem of claim 1 wherein the selected indicator indicates system status data of the computer system.

21. The subsystem of claim 1 wherein the second operating component comprises an activation pattern, and wherein the second data corresponds to a selected activation pattern of a plurality of available activation patterns.

22. The subsystem of claim 21 wherein the indicator outputs visible information, and wherein the selected activation pattern corresponds to an illumination pattern.

23. The subsystem of claim 22 wherein the control logic selects the illumination pattern from a set including steady and blink.

24. The subsystem of claim 22 wherein the control logic selects the illumination pattern from a set including steady, fast blink and slow blink.

25. The subsystem of claim 22 wherein the control logic selects the illumination pattern from a set including steady and flash.

26. The subsystem of claim 22 wherein the control logic selects the illumination pattern from a set including steady and wink.

27. The subsystem of claim 22 wherein the control logic selects the illumination pattern to output persistent-related state data to the selected indicator.

28. The subsystem of claim 22 wherein the control logic selects the illumination pattern to output change-related state data to the selected indicator.

29. The subsystem of claim 22 wherein the control logic selects the illumination pattern to output invitation-related state data to the selected indicator.

30. The subsystem of claim 22 wherein the control logic selects the illumination pattern to output reminder-related state data to the selected indicator.

31. The subsystem of claim 22 wherein the indicator outputs at least one of member a set containing visual, audible, and tactile representations.

32. The subsystem of claim 1 wherein the indicator comprises an LED.

33. The subsystem of claim 1 wherein the indicator comprises a light source that generally illuminates a monitor area.

34. A subsystem as recited in claim 1, wherein the control logic distinguishes between importance of messages received at the computer system and such that the control logic selects a first color to be illuminated at a particular indicator to reflect the presence of an unread message assigned a first priority, as well as a second color to be illuminated at the particular indicator to reflect the presence of an unread message assigned a second priority.

35. A subsystem as recited in claim 1, wherein the plurality of different indicators are integrated into a keyboard.

36. A subsystem as recited in claim 1, wherein each of the plurality of colors is associated with a different type of state information associated with the computer system.

37. In a computer system, a method comprising:
receiving state data related to a current state of the computer system;
selecting an indicator from among a plurality of indicators for outputting the state data, wherein each of the plurality of indicators corresponds to a different item of the computer system and wherein each one of the plurality of different indicators is individually associated with and includes a plurality of colors;
selecting, for each of the plurality of different indicators, an appropriate one or more of the colors that are included with each indicator, as well as an illumination pattern that is selected from a plurality of different illumination patterns for illuminating the appropriate one or more selected colors based on received state information about the computer system and the corresponding item of the computing system; and
illuminating the selected one or more appropriate colors of each indicator in the selected illumination pattern, as appropriate, in order to visually convey the state information received about the state of the computer system and the corresponding item of the computer system.

38. The method of claim 37 wherein the indicator outputs at least one of member a set containing visual, audible, and tactile representations.

39. The method of claim 37 further comprising selecting at least one other set of component data for operating the selected indicator.

40. The method of claim 37 wherein outputting control data comprises outputting data corresponding to visible information.

41. The method of claim 40 further comprising selecting at least one other set of component data corresponding to visible information for operating the selected indicator.

42. The method of claim 40 wherein the component comprises color, and wherein outputting data corresponding to visible information comprises outputting color data.

43. The method of claim 42 wherein selecting a component for operating the selected indicator comprises selecting particular color to output informational-related control data.

44. The method of claim 42 wherein selecting a component for operating the selected indicator comprises selecting particular color to output activity-related control data.

45. The method of claim 42 wherein selecting a component for operating the selected indicator comprises selecting particular color to output holding-related control data.

46. The method of claim 42 wherein selecting a component for operating the selected indicator comprises selecting particular color to output attention-related control data.

47. The method of claim 42 wherein selecting a component for operating the selected indicator comprises selecting a particular color to output life-status related control data.

48. The method of claim 37 wherein the received state data comprises power state data, and wherein selecting an indicator comprises selecting an indicator corresponding to a power indicator.

49. The method of claim 37 wherein the received state data comprises security state data, and wherein selecting an indicator comprises selecting an indicator corresponding to a security indicator.

50. The method of claim 37 wherein the received state data comprises media-related state data, and wherein selecting an indicator comprises selecting an indicator corresponding to a media indicator.

51. The method of claim 37 wherein the received state data comprises transport-related state data, and wherein selecting an indicator comprises selecting an indicator corresponding to a transport indicator.

52. The method of claim 37 wherein the received state data comprises recording-related state data, and wherein selecting an indicator comprises selecting an indicator corresponding to a recording state indicator.

53. The method of claim 37 wherein the received state data comprises system status-related state data, and wherein selecting an indicator comprises selecting an indicator corresponding to a system status indicator.

54. The method of claim 37 wherein the received state data comprises notification-related state data, and wherein selecting an indicator comprises selecting an indicator corresponding to a notification indicator.

55. The method of claim 37 wherein the received state data comprises communication-related state data, and wherein selecting an indicator comprises selecting an indicator corresponding to a communication indicator.

56. The method of claim 37 wherein the received state data comprises call-related state data, and wherein selecting an indicator comprises selecting an indicator corresponding to a call indicator.

57. The method of claim 37 wherein the received state data comprises message-related state data, and wherein selecting an indicator comprises selecting an indicator corresponding to a message indicator.

58. The method of claim 37 wherein the indicator outputs visible information, wherein the component corresponds to an illumination pattern, and wherein outputting control data comprises outputting data corresponding to a selected illumination pattern.

59. The method of claim 58 further comprising selecting at least one other set of component data corresponding to visible information for operating the selected indicator.

60. The method of claim 59 wherein at least one other set of component data comprises color data, and wherein outputting control data further comprises outputting color data.

61. The method of claim 58 wherein selecting component data for operating the selected indicator comprises selecting a steady illumination pattern.

62. The method of claim 58 wherein selecting component data for operating the selected indicator comprises selecting a blink illumination pattern.

63. The method of claim 58 wherein selecting component data for operating the selected indicator comprises selecting a fast blink illumination pattern.

64. The method of claim 58 wherein selecting component data for operating the selected indicator comprises selecting a slow blink illumination pattern.

65. The method of claim 58 wherein selecting component data for operating the selected indicator comprises selecting a wink illumination pattern.

66. The method of claim 58 wherein selecting component data for operating the selected indicator comprises selecting a steady illumination pattern.

67. The method of claim 58 wherein selecting component data for operating the selected indicator comprises selecting a flash illumination pattern.

68. The method of claim 58 wherein selecting component data for operating the selected indicator comprises selecting illumination pattern data corresponding to persistent-related state information.

69. The method of claim 58 wherein selecting component data for operating the selected indicator comprises selecting illumination pattern data corresponding to change-related state information.

70. The method of claim 58 wherein selecting component data for operating the selected indicator comprises selecting illumination pattern data corresponding to invitation-related state information.

71. The method of claim 58 wherein selecting component data for operating the selected indicator comprises selecting illumination pattern data corresponding to reminder-related state information.

72. A computer-readable storage medium storing computer-executable instructions for performing the method of claim 37.

* * * * *